(12) United States Patent
Benson et al.

(10) Patent No.: US 11,479,438 B2
(45) Date of Patent: Oct. 25, 2022

(54) NANOFIBER STRUCTURE APPLICATOR

(71) Applicant: Lintec Of America, Inc., Richardson, TX (US)

(72) Inventors: Jordan Benson, Garland, TX (US); Raquel Ovalle-Robles, Sachse, TX (US); Nicklas Keller, Plano, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 421 days.

(21) Appl. No.: 16/849,046

(22) Filed: Apr. 15, 2020

(65) Prior Publication Data

US 2020/0361741 A1      Nov. 19, 2020

Related U.S. Application Data

(60) Provisional application No. 62/848,727, filed on May 16, 2019.

(51) Int. Cl.
*B65H 49/20* (2006.01)
*D01F 9/12* (2006.01)
(Continued)

(52) U.S. Cl.
CPC .............. *B65H 49/20* (2013.01); *B82Y 40/00* (2013.01); *C01B 32/168* (2017.08); *D01F 9/12* (2013.01);
(Continued)

(58) Field of Classification Search
CPC ....... B65H 49/20; B82Y 40/00; C01B 32/168; C01B 32/158; C01B 32/159; C01B 32/16; C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04;
(Continued)

(56) References Cited

U.S. PATENT DOCUMENTS

2007/0237959 A1* 10/2007 Lemaire ................ C01B 32/162
                                                                              428/408
2008/0018012 A1*  1/2008 Lemaire .................. D01F 9/133
                                                                              425/75

(Continued)

OTHER PUBLICATIONS

Ping, et al., Clean, fast and scalable transfer of ultrathin/patterned vertically-alinged carbon nanotube arrays, Carbon 2018; 133:275-282 (Year: 2018).*

*Primary Examiner* — Daniel C. McCracken
(74) *Attorney, Agent, or Firm* — Greenblum & Bernstein, P.L.C.

(57) ABSTRACT

A nanofiber structure applicator is described that can remove two substrates from opposing major surfaces of a nanofiber structure. The two substrates can have differing adhesive strengths with the nanofiber forest. This difference in adhesive strength can be used to reorient nanofibers that form the nanofiber structure relative to the final surface on which they are applied. This reorienting of the individual nanofibers within a nanofiber structure can be used to tailor some of the properties of the nanofiber structure. Furthermore, the nanofiber structure applicator is configured can improve the convenience with which a nanofiber structure can be transported and applied to an application surface.

20 Claims, 6 Drawing Sheets

(51) Int. Cl.
*D02G 3/16* (2006.01)
*B82Y 40/00* (2011.01)
*C01B 32/168* (2017.01)

(52) U.S. Cl.
CPC ......... *D02G 3/16* (2013.01); *D10B 2101/122* (2013.01)

(58) Field of Classification Search
CPC ............ C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133; D02G 3/16; D10B 2101/122

See application file for complete search history.

(56) References Cited

U.S. PATENT DOCUMENTS

| | | | |
|---|---|---|---|
| 2008/0170982 A1* | 7/2008 | Zhang | H01L 51/444 423/447.3 |
| 2010/0310809 A1* | 12/2010 | Jiang | B32B 7/12 156/244.27 |
| 2012/0100203 A1* | 4/2012 | Fang | B01J 35/004 423/580.1 |
| 2015/0013896 A1* | 1/2015 | Zhang | C01B 32/184 204/157.41 |
| 2016/0145105 A1* | 5/2016 | Inoue | C01B 32/168 428/119 |
| 2018/0363237 A1* | 12/2018 | Huynh | C01B 32/168 |

* cited by examiner

Nanofiber forest

Example reactor for growing nanofibers

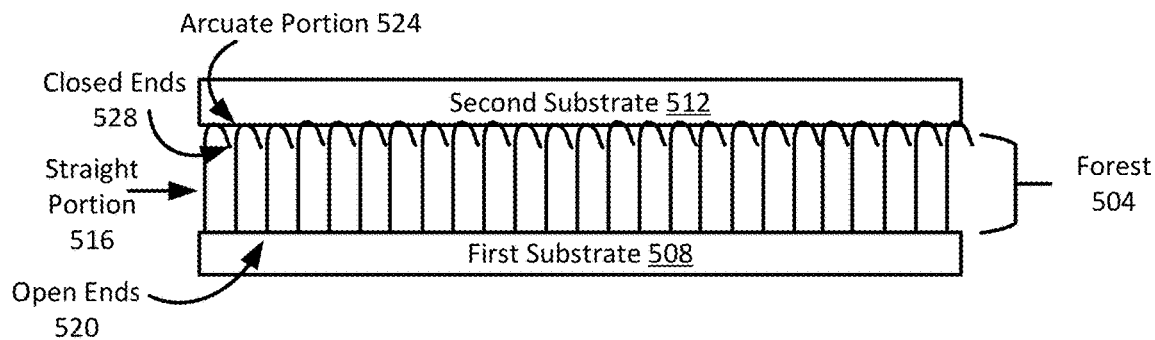
FIG. 5A
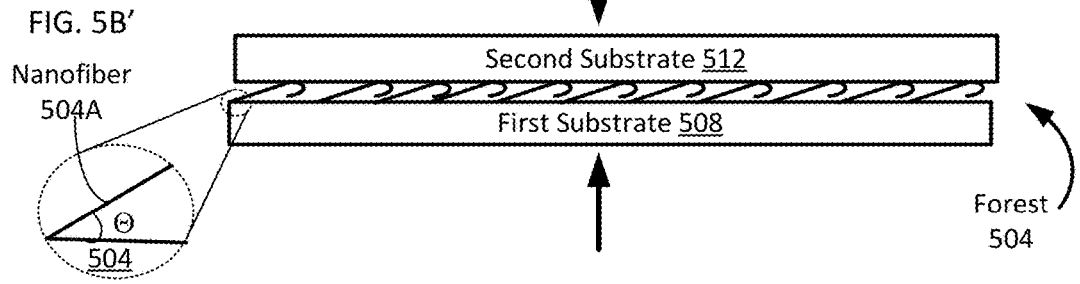
FIG. 5B
FIG. 5B'
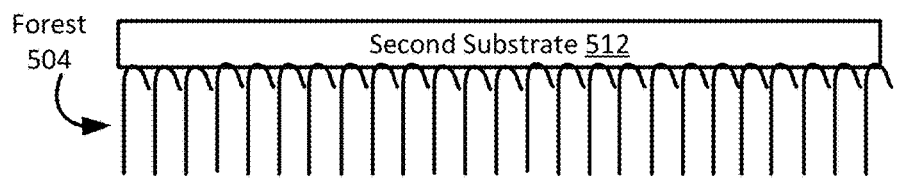
FIG. 5C
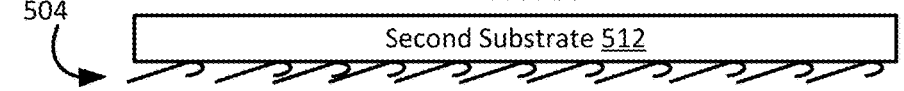
FIG. 5D
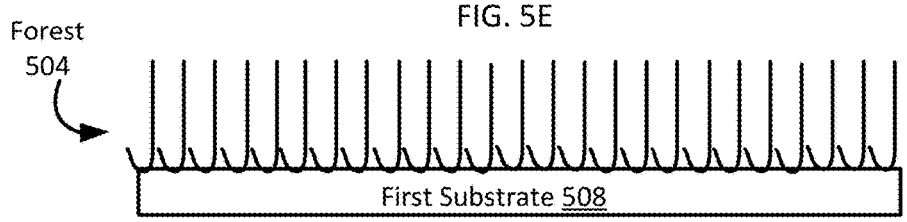
FIG. 5E
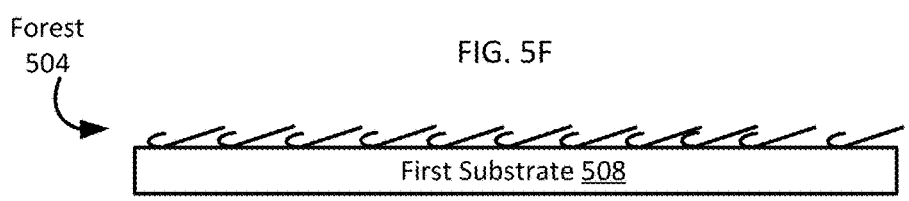
FIG. 5F FIG. 6A
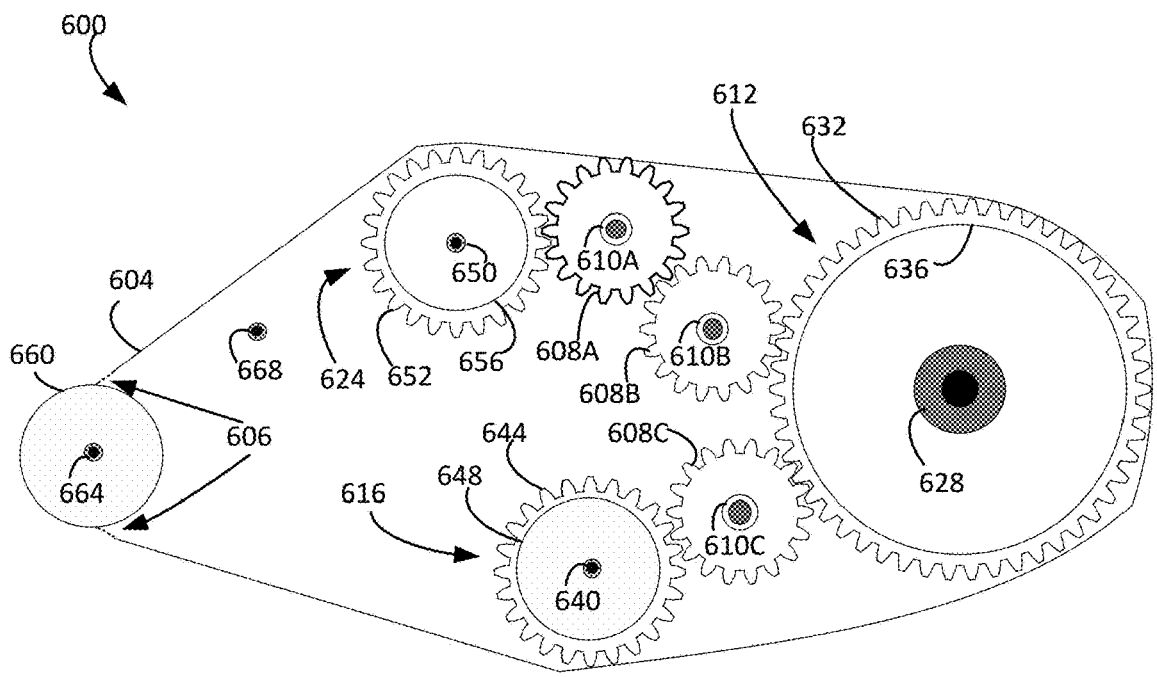
FIG. 6B
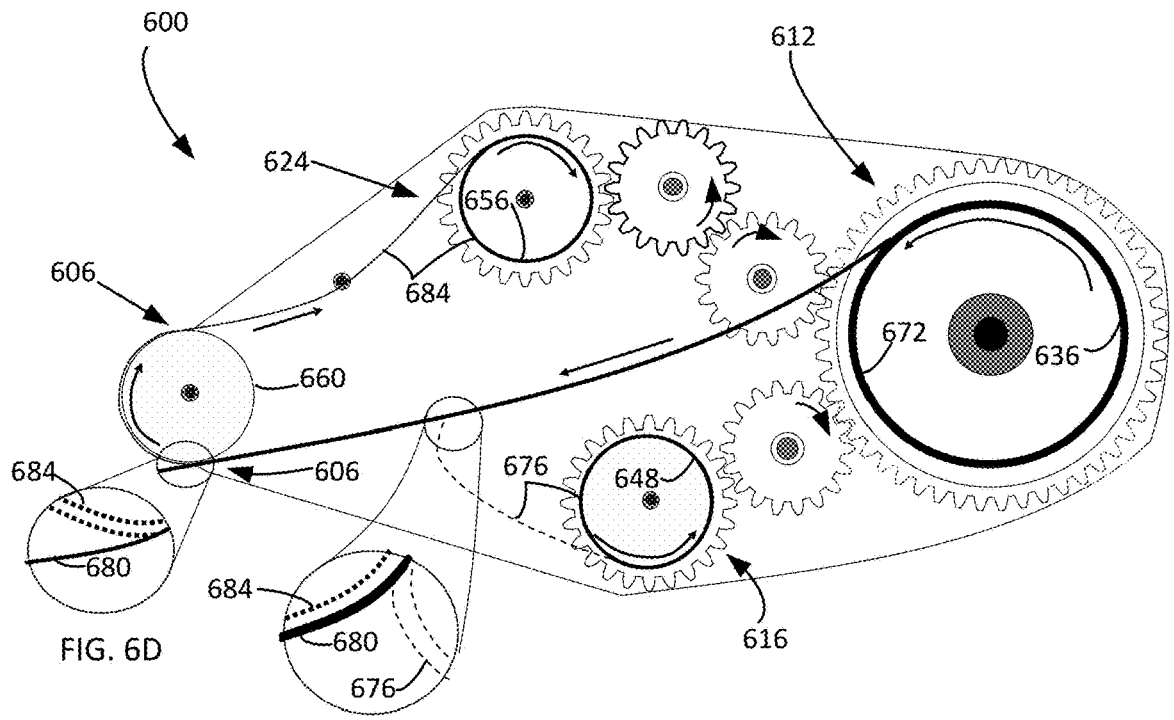
FIG. 6D
FIG. 6C FIG. 7A
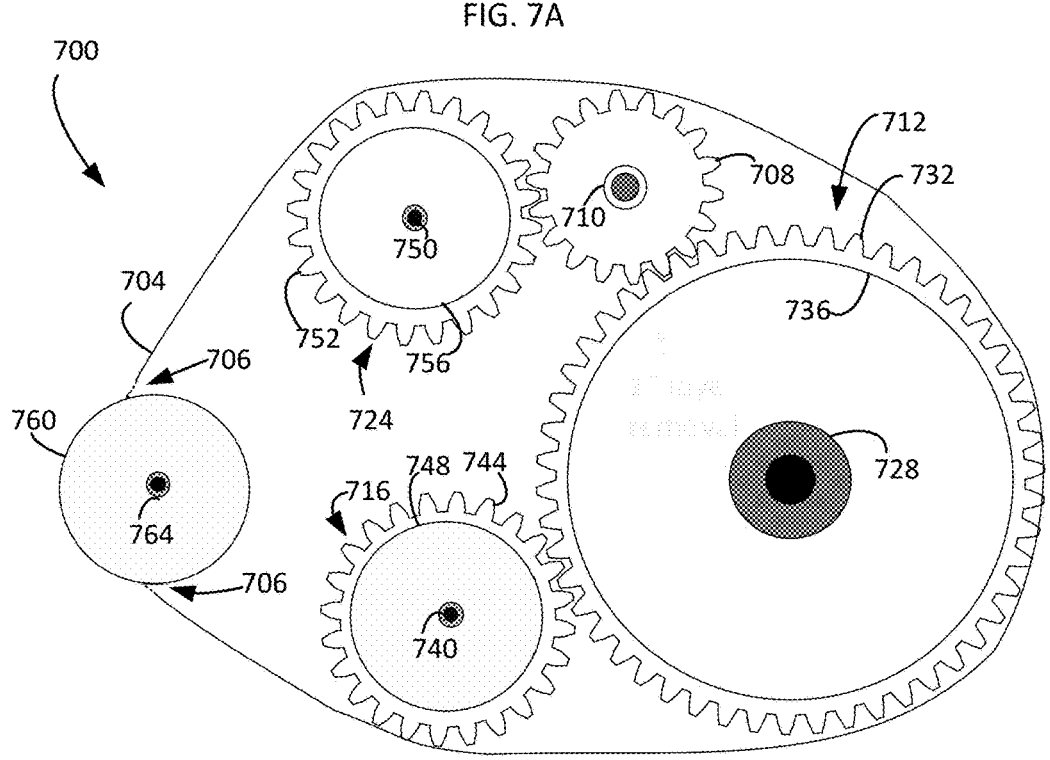
FIG. 7B
FIG. 7C
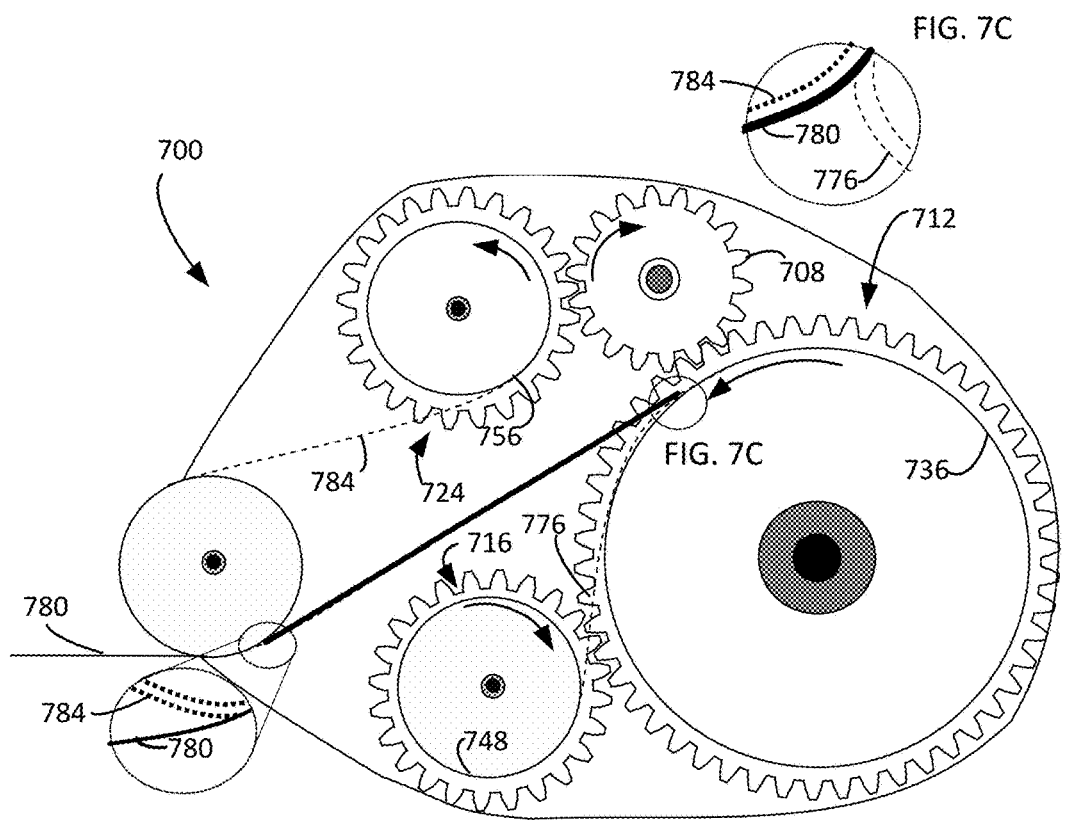
FIG. 7D

NANOFIBER STRUCTURE APPLICATOR

CROSS-REFERENCE TO RELATED APPLICATIONS

This application claims benefit under 35 U.S.C. § 119(e) to U.S. Provisional Patent Application No. 62/848,727, filed on May 16, 2019, which is hereby incorporated by reference herein in its entirety.

TECHNICAL FIELD

The present disclosure relates generally to nanofibers. Specifically, the present disclosure relates to an applicator for a nanofiber structure.

BACKGROUND

A "forest" of nanofibers or nanotubes refers to an array of nanofibers or nanotubes that are arranged substantially parallel to one another on a substrate and are oriented substantially perpendicular to a surface of the substrate. Nanofiber forests can be formed in any of a variety of ways, including growing the nanotubes by placing catalyst particles on a growth substrate, heating the substrate and catalyst particles in a furnace, and supplying a fuel compound to the heated catalyst and substrate. Nanofibers grow, often vertically, from the catalyst particles into a substantially parallel array. A nanofiber forest can be drawn into a sheet of nanofibers.

SUMMARY

Example 1 is an apparatus comprising: a housing that defines at least one port; a supply spool within the housing; a first take-up spool within the housing; a second take-up spool within the housing; and a nanofiber assembly comprising a first substrate, a second substrate, and a nanofiber structure between the first substrate and the second substrate, the nanofiber assembly wrapped around a supply spool.

Example 2 includes the subject matter of Example 1, wherein: the first take-up spool further comprises a first take-up surface, the second take-up spool further comprises a second take-up surface, and the supply spool further comprises a supply surface; and wherein the first take-up surface is configured to receive the first substrate, the second take-up surface is configured to receive the second substrate, and the supply surface is configured to dispense the nanofiber assembly.

Example 3 includes the subject matter of either of Examples 1 or 2, further comprising: a first gear connected to the first take-up surface of the first take-up spool; a second gear connected to the second take-up surface of the second take-up spool; and a third gear connected to the supply surface of the supply spool.

Example 4 includes the subject matter of any of the preceding Examples, further comprising an actuating gear in mechanical communication with the supply spool and at least one other gear wherein the actuating gear provides rotational actuation to the supply spool and the at least one other gear.

Example 5 includes the subject matter of any of the preceding Examples, wherein a first adhesive strength of the first substrate to the nanofiber structure is greater than a second adhesive strength of the second substrate to the nanofiber structure.

Example 6 includes the subject matter of any of Examples 1-4, wherein the first substrate has a first adhesive strength to the nanofiber structure that is less than a second adhesive strength of the second substrate to the nanofiber structure.

Example 7 includes the subject matter of any of the preceding Examples, further comprising a patterning device connected to the housing.

Example 8 includes the subject matter of any of the preceding Examples, wherein the patterning device is one of an electrical discharge electrode and a heating element.

Example 9 includes the subject matter of any of the preceding Examples, wherein the nanofiber structure comprises a plurality of nanofibers oriented from 0° to 10° relative to one of the first substrate and the second substrate.

Example 10 is a method comprising: placing a nanofiber assembly within a nanofiber applicator, the nanofiber assembly comprising a first substrate, a second substrate, and a nanofiber structure comprising a plurality of nanofibers between the first substrate and the second substrate; attaching a first portion of the first substrate to a first take-up spool within the nanofiber applicator; attaching a first portion of the second substrate to a second take-up spool within the nanofiber applicator; actuating the nanofiber applicator, the actuating: winding a second portion of the first substrate around the first take-up spool; winding a second portion of the second substrate and around the second take-up spool; and dispensing the nanofiber structure.

Example 11 includes the subject matter of Example 10, wherein the nanofiber structure is a nanofiber forest.

Example 12 includes the subject matter of either of Examples 10-11, wherein the first substrate has a first adhesive strength to the nanofiber structure that is greater than a second adhesive strength of the second substrate to the nanofiber structure.

Example 13 includes the subject matter of any of Examples 10-12, wherein the first substrate has a first adhesive strength to the nanofiber structure that is less than a second adhesive strength of the second substrate to the nanofiber structure.

Example 14 includes the subject matter of any of Examples 10-13, further comprising compressing the nanofiber structure between the first substrate and the second substrate prior to providing the nanofiber assembly to the nanofiber applicator, the compressing orienting the nanofibers of the nanofiber structure from 0° to 10° relative to one of the first substrate or the second substrate.

Example 15 includes the subject matter of any of Examples 10-14, wherein actuating the nanofiber structure comprises reorienting the nanofibers to an angle greater than 10° relative to one of the first substrate or the second substrate.

Example 16 includes the subject matter of any of Examples 10-15, wherein actuating the nanofiber applicator comprises providing rotational actuation to one or more of a supply spool around which the nanofiber structure is wound, the first take-up spool, and the second take-up spool.

Example 17 includes the subject matter of any of Examples 10-16, further comprising patterning the nanofiber structure upon dispensing the nanofiber structure.

Example 18 includes the subject matter of any of Examples 10-17, wherein the patterning comprises using one or more of an electrical discharge apparatus or a heater to remove at least portions of nanofibers from the nanofiber structure.

Example 19 includes the subject matter of any of Examples 10-18, wherein dispensing the nanofiber structure comprises applying the nanofiber structure to an application surface.

Example 20 includes the subject matter of any of Examples 10-19, wherein applying the nanofiber structure to the application surface comprises using an adhesive to attach the nanofiber structure to the application surface.

Example 21 includes the subject matter of any of Examples 10-19, wherein applying the nanofiber structure to the application surface comprises adhering the nanofiber structure to the application surface via direct contact without an adhesive.

BRIEF DESCRIPTION OF THE DRAWINGS

FIGS. 5A-5F are schematic side views of a nanofiber forest being compressed between two substrates, and the forest being reoriented at an angle to one of the substrates that is a function of the relative adhesive strength of the first and second substrates to the forest, in an embodiment.

FIG. 6A is a transparent side view of a nanofiber structure applicator, in an embodiment.

FIG. 6B is a transparent side view of the nanofiber structure applicator of FIG. 6A during the removal of a first substrate and a second substrate from opposing sides of the nanofiber structure, in an embodiment.

FIG. 6C is a magnified view of a nanofiber structure assembly having a first substrate removed from the assembly by the example applicator illustrated in FIG. 6B, in an embodiment.

FIG. 6D is a magnified view of a nanofiber structure assembly having a second substrate removed from the assembly by the example applicator illustrated in FIG. 6B, in an embodiment.

FIG. 7A is a transparent side view of an alternative configuration of a nanofiber structure applicator, in an embodiment.

FIG. 7B is a transparent side view of the nanofiber structure applicator of FIG. 7A and illustrates the removal of a first substrate and a second substrate from opposing sides of the nanofiber structure, in an embodiment FIG. 7C is a magnified view of a nanofiber structure assembly having a first substrate removed from the assembly by the example applicator illustrated in FIG. 7B, in an embodiment.

FIG. 7D is a magnified view of a nanofiber forest assembly having a second substrate removed from the assembly by the example applicator illustrated in FIG. 7B, in an embodiment.

Figure 1:
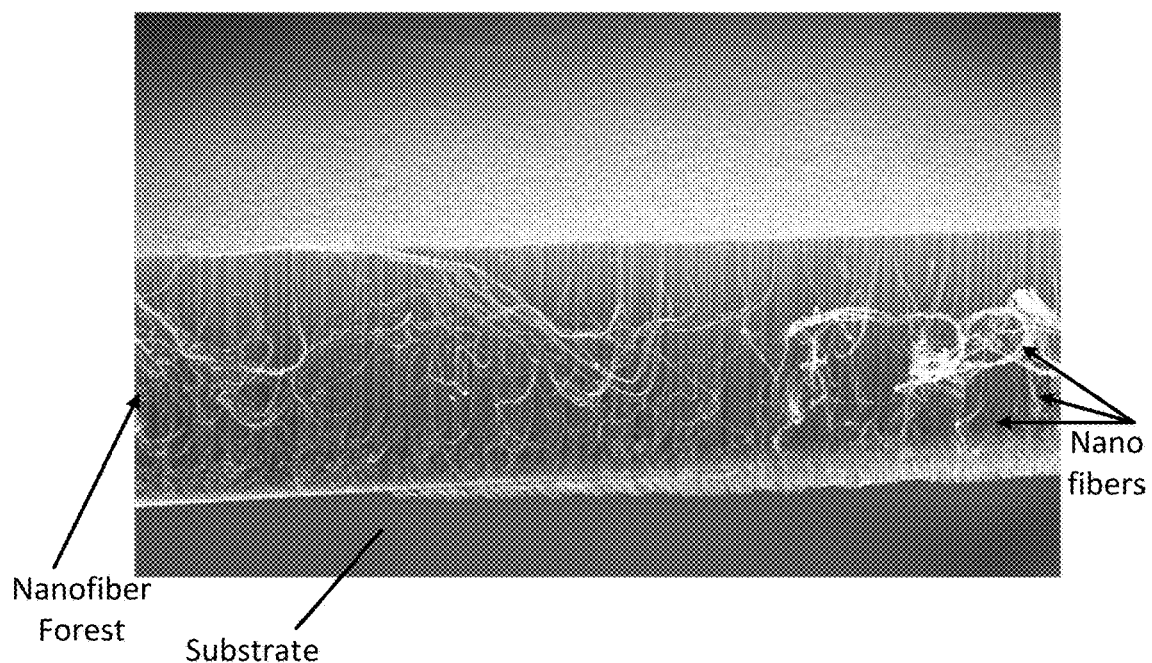
FIG. 1 is a perspective view scanning electron microscope (SEM) image of a carbon nanotube forest (alternatively referred to herein as a "layer") having a plurality of individual nanotubes, in an embodiment.
Figure 2:
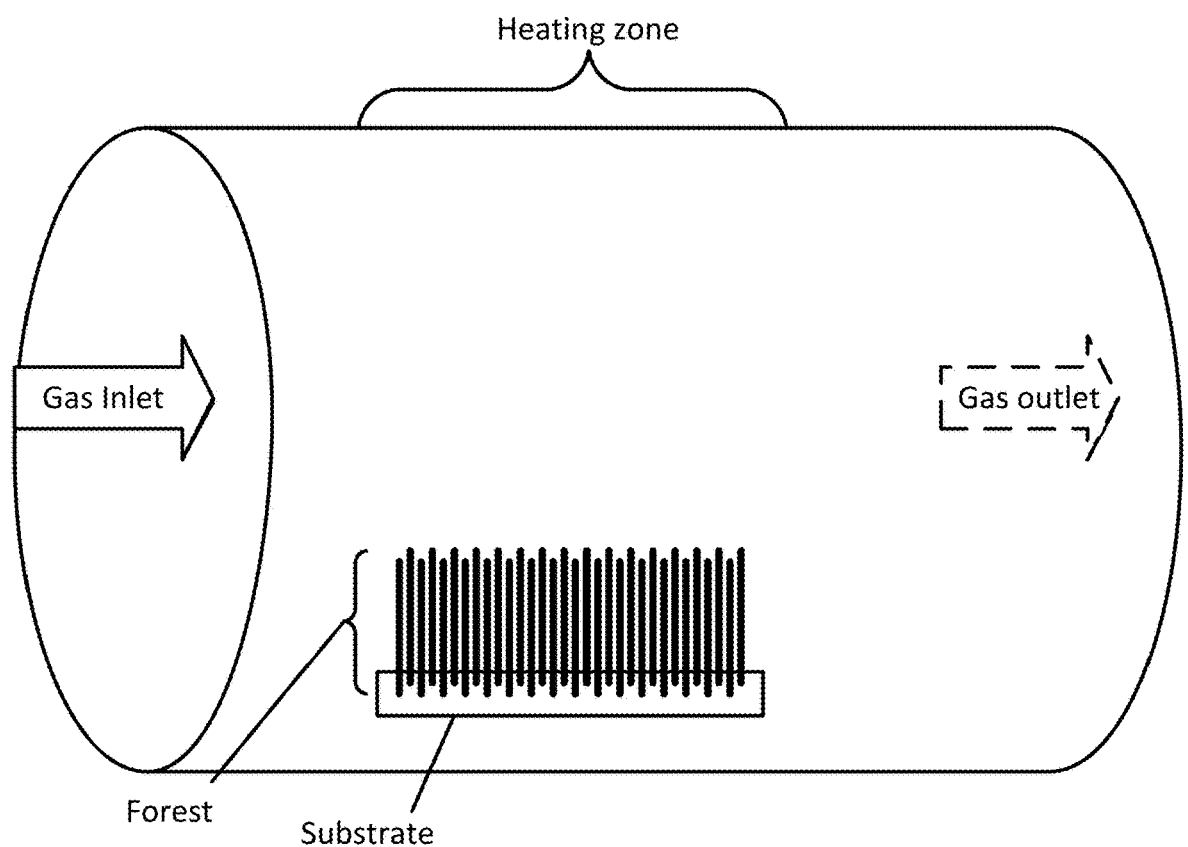
FIG. 2 is a schematic illustration of an example reactor for nanofiber growth, in an embodiment.

The figures depict various embodiments of the present disclosure for purposes of illustration only. Numerous variations, configurations, and other embodiments will be apparent from the following detailed discussion.

DETAILED DESCRIPTION

Overview

Techniques and apparatus are described for removing two substrates from opposing major surfaces of a nanofiber structure, whether a nanofiber "forest," a nanofiber sheet, or other configuration of nanofibers. In some examples, a first adhesive strength between a first substrate on a first major surface of the nanofiber structure and a second adhesive strength between a second substrate on a second major surface of the nanofiber structure opposite the first major surface can be different. The relative difference in adhesive strengths can cause the nanofiber forest to be reoriented upon removal of the substrates at an angle from 0° to 90° relative to a major surface of one of the substrates. In one example, a nanofiber structure applicator can be configured to sequentially remove a first substrate and a second substrate so as to reorient the nanofibers of the nanofiber forest and prepare the nanofiber structure for application to a surface. In some cases, a nanofiber structure applicator is configured can improve the convenience with which a nanofiber structure can be transported and applied to an application surface.

In some examples, a nanofiber structure applicator of the present disclosure can be integrated with other equipment that can translate the applicator in the X, Y, and/or Z directions, and/or can rotate the nanofiber structure applicator about a rotational axis. Integrating the applicator with a machine having translational and/or rotational capabilities can facilitate automation of applying the nanofiber structure to a surface and/or improve the accuracy and precision with which a nanofiber structure is applied to a surface. In some examples, a device that further modifies the nanofiber structure can be integrated with the nanofiber structure applicator at a location at which the nanofiber structure exits the applicator. Examples of these devices include electrical or corona discharge devices or heat sources (e.g., a resistive heater). These devices can cut and/or pattern the carbon nanofiber structure before the nanofiber structure is applied to an application surface.

Prior to describing nanofiber forest applicators, nanofiber forests, nanofiber sheets, and the synthesis thereof is described in the context of FIGS. 1-4.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm2. In some specific embodiments, a nanofiber forest as described herein may have a density of between 10 billion/cm2 and 30 billion/cm2. In other examples, the nanofiber forest as described herein may have a density in the range of 90 billion nanofibers/cm2. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, $SiO_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
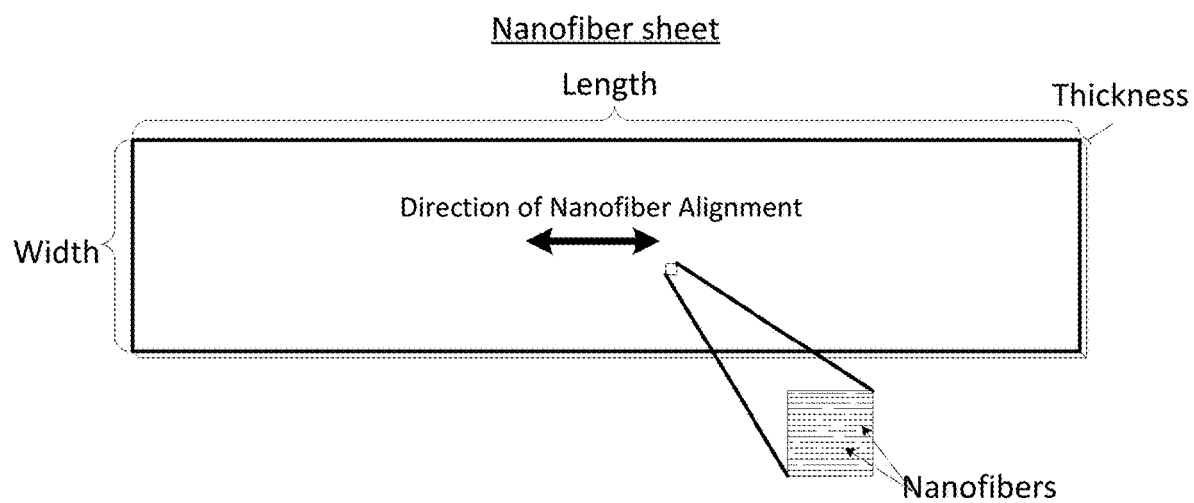
FIG. 3 is an illustration of a nanofiber sheet that identifies relative dimensions of the sheet and schematically illustrates nanofibers within the sheet aligned end-to-end in a plane parallel to major surfaces of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
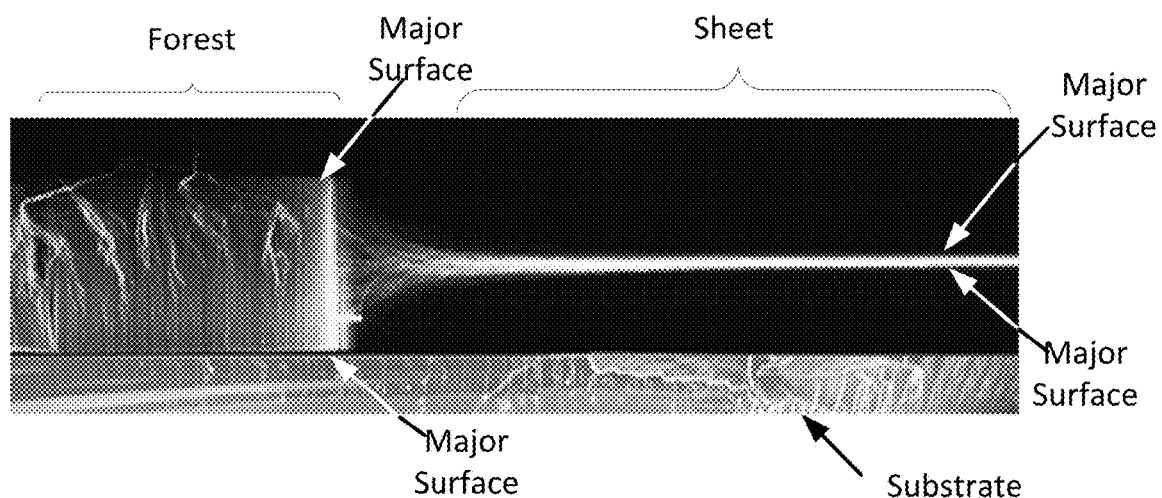
FIG. 4 is an SEM photomicrograph is an image of a nanofiber sheet being laterally drawn from a nanofiber forest, the nanofibers aligning from end-to-end as schematically shown in FIG. 3, in an embodiment

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved. As noted in FIG. 4, major surfaces of both the forest and the sheet are indicated.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Orienting Nanofibers within a Nanofiber Forest

Nanofibers that comprise a nanofiber forest typically have two portions in their as-deposited form (e.g., as synthesized on a growth substrate). These two portions are illustrated in FIG. 5A, which shows a nanofiber forest 504 between a first substrate 508 and a second substrate 512. One portion of the forest 504 is a "straight portion" 516 that terminates in an "open end" 520. The straight portion typically connects to, and is disposed near, a growth substrate in an as-grown state of a nanofiber forest 504. The second portion of a nanofiber is "an arcuate portion" 524 (also sometimes referred to as a "tangled end"). The arcuate portion 524, and more specifically a closed end 528, is at an opposite end of the nanofiber from the open end 520. Generally the tangled end 524 is disposed at an exposed surface of the nanofiber layer opposed to the growth substrate. The tangled end 524 bends away from an axis that corresponds to the straight portion 516.

As described below, selecting the adhesive strength of the first substrate 508 relative to the second substrate 512 can enable a nanofiber forest to be "flipped" so that the open ends 520 of the nanofiber forest are at an exposed surface of the nanofiber forest 504 after removal of the substrates. This orientation is unlike as-deposited nanofiber forests, where the exposed surface (i.e., the surface opposite the interface with the growth substrate) of the nanofiber forest is that of the closed ends 528. In some examples, this configuration is desired because it can improve the radiation absorbance of the nanofiber sheet by increasing exposure of inter-nanofiber spaces to incident light. For the case of hollow nanotubes, intra-fiber chambers can be exposed to incident radiation thus increasing the proportion of light that is absorbed. It has also been found that the IR emissivity is also unexpectedly high for embodiments with nanofibers in this configuration.

The process of "flipping" the orientation of the nanofiber forest so as to expose open ends 520 can also include a process of orienting straight portions 516 of the nanofibers of the forest 504 at an angle greater than 0° and less than (or equal to) 90° relative to a substrate. This can be accomplished by selecting relative adhesive strengths of the first 508 and second substrate 512. This process is described below in more detail and in particular the context of FIGS. 5B-5F.

It will be appreciated that the first substrate 508 and the second substrate 512 can include any of the following types of substrates: growth substrates (e.g. silicon, stainless steel), thermoplastic polymer sheets, elastomeric polymer sheets, fabrics, cellulosic fiber sheets, any of which can include or be coated with an adhesive or have an adhesive property. It will be appreciated that the first substrate 508 and the second substrate 512 are not limited to these examples, and that other compositions and configurations of these substrates are apparent in light of the present disclosure. For example, in some examples adhesive materials may have enough structural integrity to be formed into a self-supporting film or sheet and are not supported on a polymer or cellulosic liner. In other examples, the substrate may have an inherent tackiness or adhesive attraction to the nanofiber forest. For example a silicone substrate may be configured to grip or otherwise mechanically stick to a nanofiber forest with a relatively low adhesive strength. In an alternative example, paraffin wax may be used as a coating on a substrate into which a surface of a nanofiber forest can be affixed. This latter example is not strictly an adhesive yet provides a releasable attachment between a substrate and a nanofiber forest. It will further be appreciated that when describing embodiments of the present disclosure that include nanofiber structure applicators, substrates will generally be formed from a flexible material that can be wound around a spool or mandrel (e.g., a polymer sheet, a fabric, a cellulosic fiber sheet) for reasons that will be apparent in light of the following description. In some examples, an adhesive can be added to one or more of the substrates 508, 512 or one or more major surfaces the forest 504 using an applicator, an ink jet printer or other system that can apply a continuous layer of adhesive or a patterned layer of adhesive.

It will further be appreciated that while a single layer of nanofiber forest 504 is depicted in the figures, the techniques described herein can be adapted to stacked forests of two, three, or more nanofiber forests 504 stacked on top of one another with open ends confronting an arcuate portion of the forest below.

Returning to FIG. 5A, the nanofiber forest 504 is shown in contact with the first substrate 508 at open ends 520. The nanofiber forest 504 is shown in contact with the second substrate 512 at arcuate portion 524. The first substrate 508 and/or the second substrate 512 can be any combination of substrates described above and may have an attachment or tackiness that causes adhesion between the forest 504 and the substrates 508, 512. The adhesion can be caused by any of the adhesive materials or non-adhesive attachment mechanisms (e.g., silicone rubber substrate, paraffin wax) described above.

As shown in FIG. 5B, a compressive force is applied to one or both of the substrates 504, 508. While FIG. 5B illustrates a normal force applied both of the substrates 504, 508, it will be understood that forces can be applied using, for example, a roller (or rollers), plates, or other mechanisms that squeeze the substrates 504, 508 together. Furthermore, it will be understood that while a normal force is shown in FIG. 5B, the applied force can include both normal and shear components so that the individual nanofibers of the forest 504 (or a stack of forests) are moved from an as-grown orientation, in which a longitudinal axis of the individual fibers is typically perpendicular to a surface of a substrate, to an orientation in which the longitudinal axis of the fibers is at an acute angle to or parallel with the surface of substrates 508, 512. During such a procedure, the distance between opposing substrates 508, 512 can decrease by at least 20%, at least 30%, at least 40%, at least 50%, or at least 70%.

Regardless of the mechanism by which it is applied or the relative magnitudes of compressive and shear components of the applied force, the compressive force has the effect of aligning the nanofibers of both layers in a common direction. As shown in FIG. 5B, this force has aligned some (or all) of the individual fibers the forest 504 at an acute angle with respect to a plane of a surface of, for convenience of explanation, the first substrate 508. This angle is illustrated in more detail in FIG. 5B' which shows an individual nanofiber 504A of the forest 504 that has been oriented to an acute angle Θ relative to the first substrate 508. The precise value of the acute angle is immaterial except that it should be a lower value (e.g., having a component that is closer to 0° or in other words, closer to the surface of a substrate) than the ultimately desired orientation of the fibers prior to compression.

The first substrate 508 and the second substrate 512 can be separated from one another. As shown in FIGS. 5C-5F and described below, the orientation of the nanofiber forest after separation of the substrates 508, 512 can be selected based on the relative adhesive strengths of the substrates 508, 512. In embodiments, it is the relative difference in adhesive strengths between the first substrate and the second substrate and the corresponding forest 504 surface that influences the common direction that the nanofibers are ultimately oriented in relative to the surface of the substrate.

In a first example, the adhesion between the nanofiber forest 504 and the first substrate 508 is comparable to that between the nanofiber forest 504 and the second substrate 512. In this first example, upon separating the substrates 508, 512 from one another, the nanofibers of the nanofiber forest 504 are reoriented from the acute angle Θ to an angle that is approximately 90° (+/−10°) relative to, in this case, the second substrate 512. This is illustrated in FIG. 5C. In a second example, in which the adhesive strength between the second substrate 512 and the nanofiber forest 504 is significantly greater than that between the nanofiber forest 504 and the first substrate 508, the nanofibers remain in approximately the orientation shown in FIG. 5B at an angle Θ (+/−10°) relative to the second substrate 512.

FIGS. 5E, 5F illustrate examples in which the adhesive strength between the first substrate 508 and the nanofiber forest 504 is greater than the adhesive strength between the second substrate 512 and the nanofiber forest 504. These examples have relative adhesive values analogous to those described above in the context of FIGS. 5C, 5D except in FIGS. 5E, 5F the stronger adhesive is on the first substrate 508.

In examples, the adhesive strength of the substrates can be measured using a 180° peel adhesion test (sold by Chemin-struments® of West Chester, Ohio).

Because it is the relative strength of the adhesives that determines the orientation of the nanofibers, the adhesive strength of the first substrate 508 and the second substrate 512 can be selected based on their relative strengths. For example, a ratio of an adhesive strength of the first substrate 508 compared to the second substrate 512 can be greater than 1:1 and specifically in a range from 4:1 to 400:1. The orientation of the fibers for different ratios is understood based on the descriptions presented above. It will be further appreciated that the adhesive strength of the substrates is measured relative to the nanofiber forest 504. In some examples the nanofiber forest 504 can be infiltrated with or coated with an adhesive or other material that provides the connection to the substrates. The substrate 508, 512 themselves need not have an adhesive coating or be adhesive but merely need to have a different adhesive interaction with the adhesive used to treat the nanofiber forest 504. For example, a first substrate 508 fabricated from a polymer having butyl groups will have a greater adhesive strength with a forest 504 infiltrated with a methacrylate adhesive then will a second substrate 512 formed from a polytetrafluoroethylene (PTFE) sheet. Other analogous examples will be appreciated in light of this description.

For example, a second substrate having an adhesive strength in the range of 0.1 N/25 mm to 0.5 N/25 mm and less than that of the first substrate will enable nanofibers of a forest to be pulled approximately perpendicular to the surfaces of the substrates upon removal of the first substrate. Other ranges of adhesive strengths will also facilitate this orientation, including from 0.1 N/25 mm to 0.4 N/25 mm, from 0.1 N/25 mm to 0.2 N/25 mm, from 0.2 N/25 mm to 0.3 N/25 mm, from 0.2 n/25 mm to 0.4 N/25 mm, and from 0.3 N/25 mm to 0.5 N/25 mm. It will be appreciated that while an upper limit of 0.5 N/25 mm is described, adhesives with even higher adhesive strengths can be used.

In another example, a second substrate having an adhesive strength less that is an order of magnitude lower than those described above (and still less than the adhesive strength of the first substrate) will facilitate orientation of the fibers at an acute angle greater than the angle achieved after the compressive force is applied but less than the perpendicular configuration described immediately above. For example, adhesive strengths in the range of 0.01 N/25 mm to 0.05 N/25 mm will produce this orientation of nanofibers in the sheet. Other ranges of adhesive strengths appropriate for this orientation include 0.01 N/25 mm to 0.02 N/25 mm, 0.01 N/25 mm to 0.04 N/25 mm, and 0.02 N/25 mm to 0.03 N/25 mm.

Nanofiber Forest Applicator

Nanofiber structure applicators that improve the convenience with which a nanofiber structure can be applied to an application surface are described. Some embodiments can further improve the convenience with which the fibers of a nanofiber forest can be oriented at an angle relative to and application surface, as described below. The nanofiber structure applicators described below include mechanisms to remove as many as two flexible substrates from a nanofiber structure as described above. As also described above, in some cases these flexible and removable substrates can include an adhesive element or adhesive property that is strong enough to be used to reorient the fibers within the nanofiber structure but also release the nanofiber structure so that it can be applied to an application surface without being damaged. Adhesive values are generally on the order of 0.1 N/25 mm to 5 N/25 mm. In other examples, and adhesive can be infiltrated within or coated on the nanofiber forest (e.g., using an ink jet printer, screen printer, doctor blade). The two substrates can prevent unintentional adhesion of the nanofiber structure to a surface prior to intentional application to an application surface. Furthermore, the two substrates can prevent a nanofiber structure from adhering to itself when wound or coiled.

FIG. 6A depicts one example of a carbon nanofiber applicator 600. The applicator 600 includes a housing 604, actuating gears 608A-608C, a supply spool 612, a first take-up spool 616, a second take-up spool 624, and a wheel 660. In some examples (described below) the applicator 600 includes a nanofiber structure such as a nanofiber forest, an adhesive, and substrates on opposing major surfaces of the nanofiber forest. This configuration of a nanofiber structure (e.g., forest or sheet) between a first and a second substrate on opposing major surfaces of the forest, is referred to herein as a nanofiber assembly.

The housing 604 encases (either in whole or in part) other elements of the applicator 600. In some examples, the housing 604 is configured to facilitate the transportation via a commercial shipper of the nanofiber assembly. In this regard, the housing 604 may be fabricated (e.g., stamping, molding, additive manufacturing also known as "3-D printing") from a mechanically durable material including, but not limited to, sheet metal, and/or mechanically durable polymers such as polycarbonate, high density polyethylene, polytetrafluoroethylene (PTFE), among others. In some examples, the housing 604 can be fabricated from a single piece of material or multiple components that are hermetically sealed together so as to reduce the possible infiltration of contaminants. In some cases, the housing 604 is hermetically sealed so as to preserve an atmosphere therein (e.g., having a low particulate count consistent with a class 100 clean room, an inert atmosphere such as argon (Ar) or nitrogen ($N_2$)).

In some cases the housing 604 can define a sealable or closable port 606 through which a nanofiber forest can exit after being cycled through the applicator 600. Furthermore, the port 606 can be used to change a direction of nanofiber structure travel in cooperation with wheel 660, as described below.

The actuating gears 608 can provide rotational movement to the various elements of the applicator 600, which can include the supply spool 612, the first take-up spool 616, and the second take-up spool 624. These elements and their interactions are described below in more detail.

In some examples the actuating gears, in this case actuating gears 608A, 608B, and 608C, are connected to a source of rotational movement (not shown) so as to cause rotational movement of the gears 608 about their corresponding axles 610A, 610B, and 610C. This rotational movement can be transferred to other components with in the applicator 600 so as to dispense a nanofiber assembly and subsequently wind the first substrate and the second substrate on corresponding take-up spools. Sources of rotational movement can include an electric motor, a handle for manual rotational actuation, among other mechanisms. While the example applicator 600 includes three actuating gears 608A, 608B, and 608C, it will be appreciated that in other examples a greater number or lesser number of actuating gears 608 can be used depending on the configuration of the applicator 600. Another configuration of an applicator is described below in the context of FIG. 7A, 7B but still further variations can be appreciated in light of the present disclosure.

The supply spool 612 is configured to provide a surface around which a nanofiber assembly can be wound. As will be appreciated, a wound or coiled nanofiber structure provides a compact form that enables convenient storage and/or shipment of the nanofiber structure prior to application to an application surface.

The supply spool 612 includes three components: an axle 628, a gear 632, and a supply surface 636. The axle 628 provides a surface around which the supply spool 612 can rotate, thus dispensing the nanofiber forest, when rotated by, in this case, actuating gear 608B. The axle 628 may also include other structures to facilitate rotation, such as a bearing. The gear 632 is configured to mesh with an actuating gear (i.e., actuating gear 608B) so that the rotational movement imparted to one or more actuating gears can cause rotational movement in the supply spool 612. The supply surface 636 can, in some examples, be a cylindrical structure attached to other elements of the supply spool 612 (e.g., gear 632) around which the nanofiber structure is wound. The supply surface 636 can be dimensioned and configured with any of a variety of sizes so as to accommodate a width of the nanofiber forest.

The first take-up spool 616 and the second take-up spool 624 are configured similarly to the supply spool 612 in that both of the first take-up spool 616 and the second take-up spool 624 include an axle, a gear, and a surface onto which the corresponding first substrate and second substrate can be wound. More specifically, the first take-up spool 616 includes an axle 640, a gear 644, and a take-up surface 648. The second take-up spool 624 includes an axle 650, a gear 652, and a take-up surface 656. As described above, the axles 640, 650 provide a structure around which the corresponding take-up spool 616, 624 can rotate when actuated by one or more of gears 608. The rotational actuation from the gears 608 is transferred to the first and second take-up spools 616, 624 via gears 644, 652 that interlock with one or more of the actuation gears 608. As will be appreciated particularly in light of the following description associated with FIG. 6B, a first substrate on the forest is removed proximate to the first take-up spool 616 and is subsequently wound around take-up surface 648. Similarly, the second substrate on the forest is removed proximate to the second take-up spool 624 and subsequently wound around the take-up surface 656.

The housing 600 can further include a wheel 660. As will be appreciated in light of the following description of FIG.

6B, the wheel can redirect the second substrate toward the second take-up spool 624 after removal of the first substrate. The wheel 660 can rotate around axle 664. Unlike other elements described above, the wheel 660 does not require rotational actuation but rather can rotate freely. In some examples a pin guide 668 can be included within the housing so as to maintain a desired tension within the forest web as it is being processed.

Turning now to FIG. 6B, the applicator 600 is shown processing a nanofiber forest that has been covered on both major surfaces with the first substrate and a second substrate. For convenience, a nanofiber forest (or other structures such as a nanofiber sheet) that has been covered on opposing major surfaces with a first substrate and a second substrate is described herein as nanofiber assembly 672. It will be noted that FIG. 6B omits some of the reference numerals for elements indicated in FIG. 6A for clarity of depiction.

As shown, a nanofiber assembly 672 is disposed around the supply surface 636 of the supply spool 612. As described above, and visible in FIG. 6C, the nanofiber assembly 672 includes a nanofiber structure 680 that is covered on a first major surface by a first substrate 676 and covered on a second major surface by a second substrate 684.

The nanofiber assembly 672 can be threaded so as to extend through an interior of the applicator 600. A leader or a first portion of the first substrate 676 can be wound around the first take-up spool surface 648. The nanofiber assembly 672 can be actuated through the applicator 600 so that the first substrate 676 is wound around the take-up surface 648 of the first take-up spool 616. The remaining layers of the nanofiber structure 680 exit the applicator 600 via port 606.

Having been pre-threaded so that a leader or first portion of the second substrate is wound around take-up surface 656, the second substrate 684 contacts the wheel 660 and is removed from the second major surface of the nanofiber structure 680 (as illustrated in FIG. 6D). The second substrate 684 reenters the applicator 600 after removal from the nanofiber structure 680 to be coiled around the take-up spool surface 656 of the second take up spool 624.

As described above, and orientation of the nanofibers of the nanofiber structure 680 can be changed depending on the relative adhesive strengths of the first substrate 676 and the second substrate 684. The nanofiber structure 680 can be applied to an application surface using any infiltrated adhesive or adhesive previously applied to and remaining on one or both of the major surfaces of the nanofiber structure 680.

FIGS. 7A and 7B illustrate an alternative configuration of a nanofiber structure applicator 700. Turning first to FIG. 7A, it will be appreciated that many of the structures shown here are analogous to those illustrated in FIG. 6A. The nanofiber structure applicator 700 includes a housing 704, an actuating gear 708, a supply spool 712, a first take-up spool 716, a second take-up spool 724, and a wheel 760.

The housing 704 is analogous to the housing 604 described above.

The actuating gear 708 rotates around the axle 710 upon receiving rotational actuation, analogous to the actuating gear 608 described above. As the actuating gear 708 rotates, rotational motion is provided to the other rotating elements in the applicator 700 via structures that interlock with the actuating gear 708.

The supply spool 712 includes a supply surface 736, and a gear 732, and is connected to an axle 720. The gear 732 interlocks with the actuating gear 708 so as to cause rotation of the supply spool 712 about the axle 728.

The first take-up spool 716 and second take-up spool 724 rotate by actuation of gears 744, 752 that interlock with actuating gear 708 and supply spool gear 732, respectively. The rotation of the take-up spools 716, 724 functions to remove a first and second substrate from first and second major surfaces of a nanofiber structure 780 and to store these substrates on corresponding take-up surfaces 748, 756.

The wheel 760 enables redirection of the second substrate into the interior of the applicator 700 after it has been removed from the nanofiber structure. In this way, the second take-up spool 724 can be used to wind and store the second substrate.

FIG. 7B illustrates operation of the applicator 700 on a multilayer nanofiber assembly that includes a first substrate 776 and second substrate 784 on opposing sides of a nanofiber structure 780. As described above, the nanofiber structure 780 can include a nanofiber forest infiltrated with a polymer, an adhesive, or some other component. The first substrate 776 and second substrate 784 can include any of the previously described examples.

The nanofiber structure can be threaded through the applicator 700, with leading portions of the first substrate 776 and the second substrate 784 wound around, attached to, or mounted upon the storage surfaces 748, 756 of the first and second take-up spools 716, 724. Upon actuation of the actuating gear 708, the supply spool 712 dispenses the nanofiber structure. The first substrate 776 is removed from a corresponding major surface of the nanofiber structure 780 and stored on the storage surface 748 of the first take up spool 716. This is shown in a magnified view in FIG. 7C. Similarly, as the nanofiber structure 780 exits the applicator 700 through a port 706 proximate to the wheel 760, the second substrate 784 is redirected and wound around storage surface 756 of the second take-up spool 724. This is illustrated in the magnified view of FIG. 7D. The nanofiber structure 780 can be applied to any receptive surface and, depending on the relative adhesive strengths of the first and second substrates, the nanofibers of a nanofiber structure that is a forest can have any desired angle relative to the final application surface.

Figure 8:
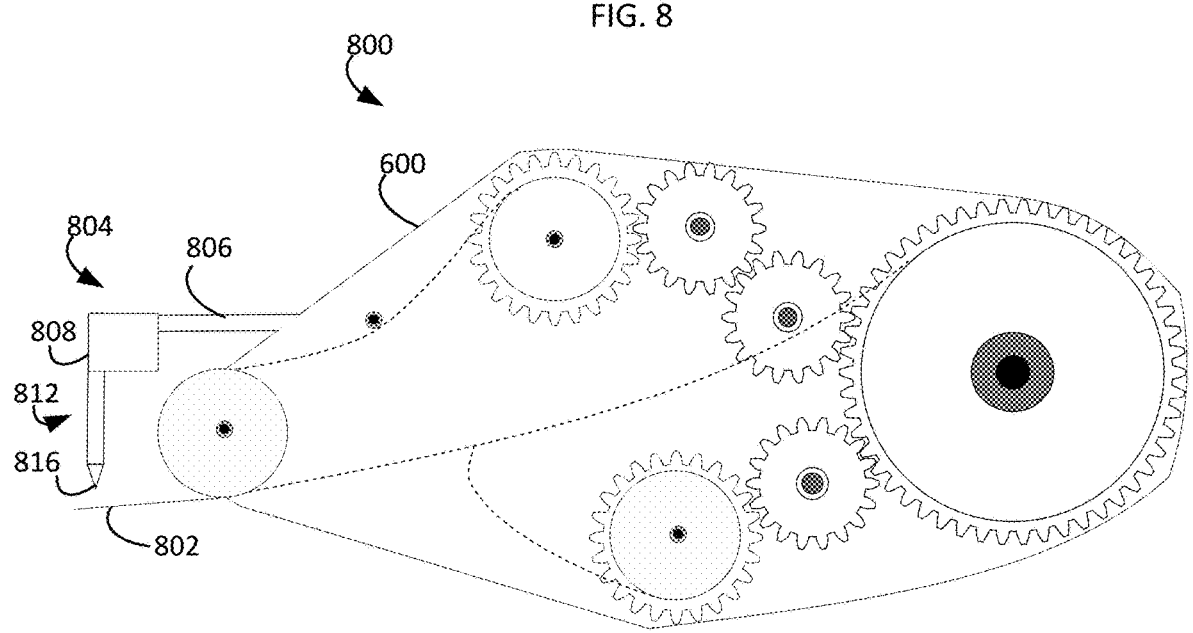
FIG. 8 is a transparent side view of a nanofiber structure applicator that further includes an electrical discharge device for patterning and/or cutting the nanofiber structure, in an embodiment.

FIG. 8 illustrates an example of a nanofiber structure applicator system 800 that includes a patterning device 804 that can create patterns and/or negative space images in the nanofiber structure as it exits the applicator 800.

The system 800 itself includes the applicator 600 described above but it will be appreciated that the applicator 700 can also be used in place of the applicator 600. The system 800 also includes a patterning device 804. The patterning device 804 includes a connector 806, a translator 808, and electrode 812.

In some examples, the patterning device 804 is connected to the housing 600 via connector 806 (e.g., a strut, brace, bar, clamp). As the exposed nanofiber structure 802 exits the applicator 600, the patterning device 804 can create patterns in the nanofiber structure 802. For example, the electrode 812 can include a tip 816 that in one example can be used to generate an electrical discharge (e.g., a corona or an electrical arc). This electrical discharge can remove portions of the nanofiber structure 802, thus creating negative pattern (i.e., a pattern formed by the absence of nanofiber material) in the nanofiber structure 802. Example patterns include a regular pattern of holes (e.g., at the vertices of a square or triangle) or irregular pattern of holes (e.g., randomly distributed, holes of varying shape) that can be as small at 1 µm in diameter or as large as several millimeters in diameter.

Figure 9:
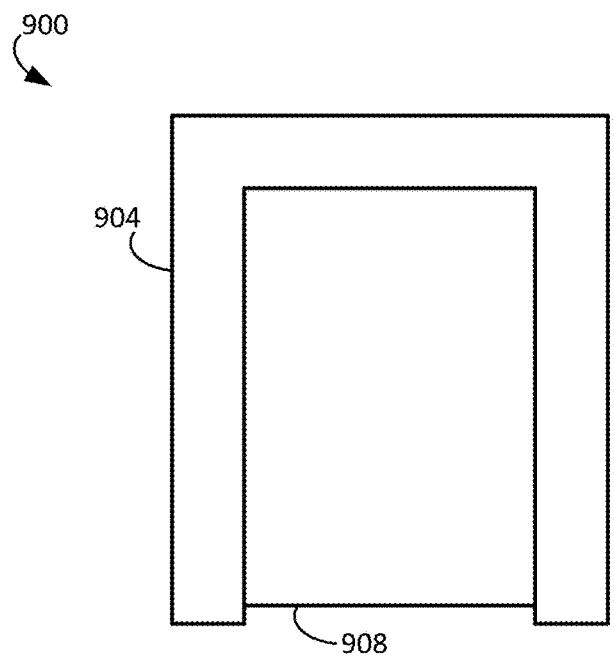
FIG. 9 is an elevational front view of a resistive heating element that can be used to pattern a nanofiber structure, in an embodiment.

In other examples, the tip 816 can be a heating element 900 as illustrated in FIG. 9. the heating element includes a frame 904 and heat source 908. The heating element 900 (e.g., a resistive heating element) can be used to apply heat to selected regions of the nanofiber structure 802 as it exits the applicator 600. In this example, the frame 904 can connect to the translator 808 and/or electrode 812, replacing the electrical discharge tip 816. Electrode 812 can connect to electrical contacts on, within, or near the frame 904 so as to supply electrical power to the heat source 908.

In some examples, this can create a pattern of nanofibers of varying heights in the nanofiber structure. In one example, portions of a nanofiber forest having a height of approximately 1 mm can be selectively exposed to the heat source 908 so that the nanofiber forest is partially combusted or burned so as to include regions of varying height. In other words, by exposure to the heat source 908 (e.g., a heated wire extending laterally, a parallel to a major surface of the forest 802, as shown in FIG. 9) the nanofiber forest 802 can include unprocessed regions that remain from 900 µm to 1 mm thick, thin regions that are from 100 µm to 500 µm thick, and mid-thickness regions that are from 500 µm to 900 µm thick.

These patterns variations in height can also be formed into patterns (e.g., polygons, ellipses, open-form shapes such as spirals, letters) upon movement of the frame 904 and heat source 908 relative to the surface of the nanofiber structure 802 caused by the translator 808. The translator 808 can further include elements that move the heat source 908 (and frame 904) in X, Y, and/or Z directions. This combination of movement in 3 axes can be used to create any of the patterns in the nanofiber structure 802 described above.

Other Embodiments

In some examples, any one or more of the applicators 600, 700, the system 800, or the patterning device 804 can be connected to a translator (analogous to the translator 808) that can move the applicator 600, 700 and/or system 800 in X, Y, and/or Z directions. In some examples, the translator can be a CNC machine. In this way, patterning or application of the nanofiber structure 802 to an application surface can be automated so as to improve precision and speed of the process. In some examples, a translator can be configured to orient any one or more of the applicators 600, 700, or the system 800 by rotational motion that can be in addition to translation in X, Y, and/or Z directions. The ability to rotate applicators 600, 700, or the system 800 can improve the application of the nanofiber structure 802 to some configurations of surfaces.

In still another embodiment, it will be appreciated that any one or more of the applicators 600, 700, or the system 800 can be loaded with any orientation of nanofiber structure including a "flattened" nanofiber structure as depicted in FIG. 5B. During application of the nanofiber structure to a final surface (e.g., by adhering a leading edge of the nanofiber structure to the final surface and then translating the applicator/system) the substrates are removed and the nanofiber forest may optionally be reoriented as a function of the relative adhesive strengths of the first and second substrates, as described above. The applicator will automatically collect the first and second substrates, thus improving the convenience of application and reducing the possibility of contamination damage of the applied nanofiber structure by one of the substrates. In some examples it will be appreciated that only one of the major surfaces of the nanofiber structure, the major surface to be adhered to a final surface, includes an adhesive. Nevertheless, the nanofiber structure can be reoriented as described above given the relative adhesive strengths of the substrates.

In some examples, any one or more of the applicators 600, 700, or the system 800 can be loaded with the nanofiber structure that is approximately 90° relative to the first and second substrates and is applied to a final surface while retaining that orientation. Depending on the selection of relative adhesive strengths, a nanofiber forest can be adhered to a final surface and an orientation of anywhere between 0° and 90° relative to this final surface.

While the foregoing descriptions have been presented primarily in terms of a nanofiber structure between two substrates, it will be appreciated that the nanofiber assembly can include more than that three layers described above. In some examples, additional layers (e.g., multiple substrates on one or both sides, including release liners, protective layers, or other layers) can be included in the nanofiber structure. In some cases, additional take-up spools and/or wheels/pins can be included to redirect and collect any of these supplemental layers that may be between a substrate and the nanofiber structure.

FURTHER CONSIDERATIONS

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. An apparatus comprising:
a housing that defines at least one port;
a supply spool within the housing;
a first take-up spool within the housing;
a second take-up spool within the housing; and
a nanofiber assembly comprising a first substrate, a second substrate, and a nanofiber structure between the first substrate and the second substrate, the nanofiber assembly wrapped around a supply spool.

2. The apparatus of claim 1, wherein:
the first take-up spool further comprises a first take-up surface, the second take-up spool further comprises a second take-up surface, and the supply spool further comprises a supply surface; and
wherein the first take-up surface is configured to receive the first substrate, the second take-up surface is configured to receive the second substrate, and the supply surface is configured to dispense the nanofiber assembly.

3. The apparatus of claim 2, further comprising:
a first gear connected to the first take-up surface of the first take-up spool;
a second gear connected to the second take-up surface of the second take-up spool; and
a third gear connected to the supply surface of the supply spool.

4. The apparatus of claim 1, further comprising an actuating gear in mechanical communication with the supply spool and at least one other gear wherein the actuating gear provides rotational actuation to the supply spool and the at least one other gear.

5. The apparatus of claim 1, wherein a first adhesive strength of the first substrate to the nanofiber structure is greater than a second adhesive strength of the second substrate to the nanofiber structure.

6. The apparatus of claim 1, wherein the first substrate has a first adhesive strength to the nanofiber structure that is less than a second adhesive strength of the second substrate to the nanofiber structure.

7. The apparatus of claim 1, further comprising a patterning device connected to the housing.

8. The apparatus of claim 7, wherein the patterning device is one of an electrical discharge electrode and a heating element.

9. The apparatus of claim 1, wherein the nanofiber structure comprises a plurality of nanofibers oriented from 0° to 10° relative to one of the first substrate and the second substrate.

10. A method comprising:
    placing a nanofiber assembly within a nanofiber applicator, the nanofiber assembly comprising a first substrate, a second substrate, and a nanofiber structure comprising a plurality of nanofibers between the first substrate and the second substrate;
    attaching a first portion of the first substrate to a first take-up spool within the nanofiber applicator;
    attaching a first portion of the second substrate to a second take-up spool within the nanofiber applicator;
    actuating the nanofiber applicator, the actuating:
        winding a second portion of the first substrate around the first take-up spool;
        winding a second portion of the second substrate and around the second take-up spool; and
        dispensing the nanofiber structure.

11. The method of claim 10, wherein the nanofiber structure is a nanofiber forest.

12. The method of claim 10, wherein the first substrate has a first adhesive strength to the nanofiber structure that is greater than a second adhesive strength of the second substrate to the nanofiber structure.

13. The method of claim 10, wherein the first substrate has a first adhesive strength to the nanofiber structure that is less than a second adhesive strength of the second substrate to the nanofiber structure.

14. The method of claim 10, further comprising compressing the nanofiber structure between the first substrate and the second substrate prior to providing the nanofiber assembly to the nanofiber applicator, the compressing orienting the nanofibers of the nanofiber structure from 0° to 10° relative to one of the first substrate or the second substrate.

15. The method of claim 10, wherein actuating the nanofiber structure comprises reorienting the nanofibers to an angle greater than 10° relative to one of the first substrate or the second substrate.

16. The method of claim 10, wherein actuating the nanofiber applicator comprises providing rotational actuation to one or more of a supply spool around which the nanofiber structure is wound, the first take-up spool, and the second take-up spool.

17. The method of claim 10, further comprising patterning the nanofiber structure upon dispensing the nanofiber structure.

18. The method of claim 10, wherein the patterning comprises using one or more of an electrical discharge apparatus or a heater to remove at least portions of nanofibers from the nanofiber structure.

19. The method of claim 10, wherein dispensing the nanofiber structure comprises applying the nanofiber structure to an application surface.

20. The method of claim 10, wherein applying the nanofiber structure to the application surface comprises using an adhesive to attach the nanofiber structure to the application surface.

* * * * *